United States Patent
Kunihiro

(10) Patent No.: US 8,393,316 B2
(45) Date of Patent: Mar. 12, 2013

(54) INTERNAL-COMBUSTION-ENGINE CONTROL APPARATUS

(75) Inventor: Mitsuyasu Kunihiro, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1101 days.

(21) Appl. No.: 12/350,038

(22) Filed: Jan. 7, 2009

(65) Prior Publication Data

US 2009/0299601 A1    Dec. 3, 2009

(30) Foreign Application Priority Data

May 28, 2008    (JP) ................. 2008-139609

(51) Int. Cl.
*F02D 41/00* (2006.01)
*G01N 7/06* (2006.01)

(52) U.S. Cl. .............. 123/697; 60/285; 73/23.32

(58) Field of Classification Search ............ 73/23.31, 73/23.32, 31.01–35.13; 123/697; 60/285; 204/408
See application file for complete search history.

(56) References Cited

U.S. PATENT DOCUMENTS

| | | | | |
|---|---|---|---|---|
| 4,244,340 A * | 1/1981 | Herth et al. | ............... | 123/688 |
| 4,278,060 A * | 7/1981 | Isobe et al. | ............... | 123/696 |
| 4,594,984 A * | 6/1986 | Raff et al. | ............... | 123/681 |
| 4,601,273 A * | 7/1986 | Kitahara et al. | ............ | 73/23.32 |
| 5,249,453 A * | 10/1993 | Usami et al. | ............. | 73/23.32 |
| 5,265,458 A * | 11/1993 | Usami et al. | ............. | 73/23.32 |
| 5,777,204 A * | 7/1998 | Abe | ............ | 73/23.32 |
| 6,332,459 B1 * | 12/2001 | Ehara et al. | ............ | 123/697 |
| 7,047,728 B2 * | 5/2006 | Yasui | ............ | 60/285 |
| 7,856,306 B2 * | 12/2010 | Nomura et al. | ............ | 701/109 |
| 2005/0252497 A1 * | 11/2005 | Yasui et al. | ............ | 123/697 |

FOREIGN PATENT DOCUMENTS

JP    2006-275628 A    10/2006

* cited by examiner

*Primary Examiner* — John Fitzgerald
(74) *Attorney, Agent, or Firm* — Sughrue Mion, PLLC

(57) ABSTRACT

In an internal-combustion-engine control apparatus provided with an exhaust gas sensor control device that outputs a detection signal detected by an exhaust-gas sensor, while switching amplification factors of an amplification circuit or offset voltages of an offset circuit, it is determined whether the exhaust-gas sensor is in an activation state or not, and an electric current flowing into the exhaust-gas sensor is stopped, in the case where it is determined that the exhaust-gas sensor is in a non-activation state; the amplification factors of the amplification circuit are switched so that there is detected an air-fuel ratio signal at the time when an electric current flowing into the exhaust-gas sensor is stopped, and it is determined whether or not the offset circuit is abnormal, based on whether the respective air-fuel ratio signals at the amplification factors are within a predetermined range.

6 Claims, 10 Drawing Sheets

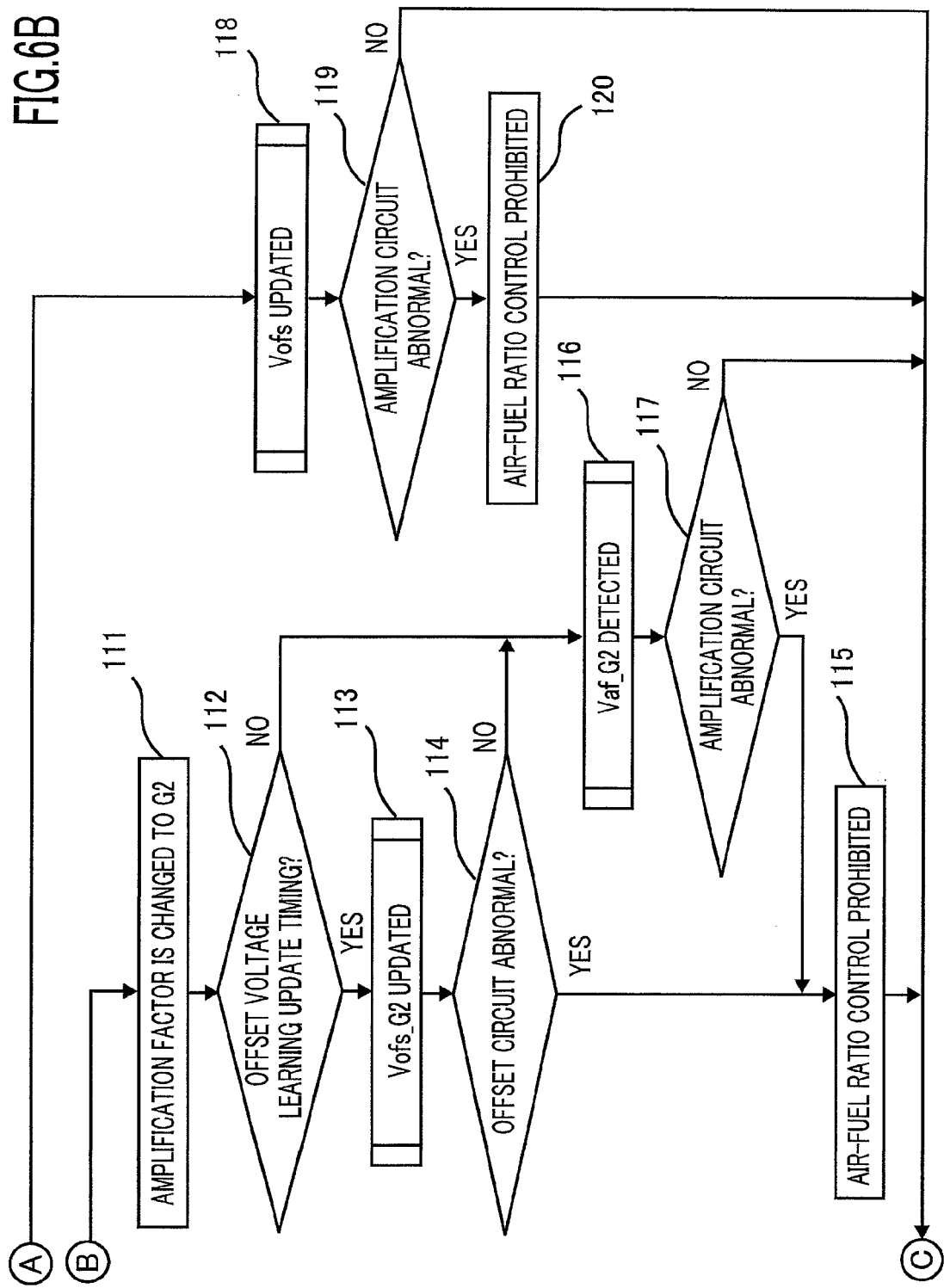

INTERNAL-COMBUSTION-ENGINE CONTROL APPARATUS

BACKGROUND OF THE INVENTION

1. Field of the Invention

The present invention relates to an internal-combustion-engine control apparatus, and particularly to an internal-combustion-engine control apparatus provided with an exhaust gas sensor control device having an abnormality-determination function for an exhaust-gas sensor that detects the air-fuel ratio of an exhaust gas.

2. Description of the Related Art

The result of detection, of an air-fuel ratio, by an exhaust-gas sensor that detects the air-fuel ratio of an exhaust gas is utilized in an air-fuel ratio control system configured with an engine control unit (referred to as an ECU, hereinafter) and the like; the foregoing result is utilized in order to realize, for example, stoichiometric combustion control in which an air-fuel ratio is feedback-controlled in the vicinity of the stoichiometry (theoretical air-fuel ratio), lean combustion control in which an air-fuel ratio is feedback-controlled in a predetermined lean region, and the like.

In the foregoing air-fuel ratio control system, it is strongly requested to expand an air-fuel ratio detection range so as to enable air-fuel ratio detection in a wide region and to raise the accuracy of detection of an air-fuel ratio in the range. As a technology of this kind, there has been disclosed a technology in which an amplification factor or an offset voltage for a detection signal obtained a gas sensor element is selected on a timely basis by an amplification circuit so that, in the case where a low amplification factor is selected, a wide-range output corresponding to a wide air-fuel ratio range can be obtained, and in the case where a high amplification factor is selected, a narrow-range output corresponding to a narrow air-fuel ratio range can be obtained (for example, refer to Japanese Patent Laid-Open Pub. No. 2006-275628 (paragraph 0009, FIG. 1)).

However, as disclosed in Japanese Patent Laid-Open Pub. No. 2006-275628, in the case where an amplification circuit performs switching of the amplification factor thereof or the offset voltage thereof so as to detects an air-fuel ratio signal, for example, there has been a problem that, when an abnormality in the amplification circuit causes an abnormality in the air-fuel ratio signal, no appropriate air-fuel ratio control can be performed, whereby the exhaust gas is deteriorated.

SUMMARY OF THE INVENTION

The present invention has been implemented in consideration of the foregoing problems; the objective thereof is to provide an internal-combustion-engine control apparatus in which there is provided an exhaust gas sensor control device that outputs a detection signal obtained by an exhaust-gas sensor while switching an amplification factor or an offset voltage, and in the case where an abnormality occurs in the amplification circuit or the offset circuit, the abnormality is rapidly detected so as to prevent deterioration in the exhaust gas.

An internal-combustion-engine control apparatus according to the present invention is provided with an exhaust-gas sensor that outputs as a detection signal an electric current that varies in accordance with an air-fuel ratio of an exhaust gas of an internal combustion engine; a current detection resistor that detects the electric current; an amplification circuit that amplifies, while switching amplification factors thereof, the detection signal detected by the current detection resistor, in a plurality of detection ranges for an air-fuel ratio that can be detected by the exhaust-gas sensor; an offset circuit that adds an offset voltage to the detection signal amplified by the amplification circuit so that said detection signal becomes an air-fuel ratio signal that can be detected by an A/D converter; and an air-fuel ratio detection means that makes an electric current flow, in accordance with the air-fuel ratio signal, into the exhaust-gas sensor and corrects an air-fuel ratio of the internal combustion engine in such a way that said air-fuel ratio becomes a target air-fuel ratio. The air-fuel ratio detection means determines whether the exhaust-gas sensor is in an activation state or in a non-activation state, and stops an electric current flowing into the exhaust-gas sensor, in the case where it is determined that the exhaust-gas sensor is in a non-activation state; the air-fuel ratio detection means switches the amplification factors of the amplification circuit so as to detect the air-fuel ratio signal at the time when an electric current flowing into the exhaust-gas sensor is stopped, and determines whether or not the offset circuit is abnormal, based on whether or not the respective air-fuel ratio signals at the amplification factors are within a predetermined range.

In an internal-combustion-engine control apparatus according to the present invention, before the detection of an air-fuel ratio signal is started, an abnormality in an offset circuit is rapidly detected; therefore, air-fuel ratio control is prevented from being performed when the air-fuel ratio signal is in an abnormal state, whereby deterioration in the exhaust gas can be prevented.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

An embodiment for an internal-combustion-engine control apparatus according to the present invention will be explained below, with reference to the accompanying drawings. In addition, the invention is not limited to the embodiment.

Embodiment 1

Hereinafter, Embodiment 1 of the present invention will be explained in detail, with reference to the accompanying drawings. In Embodiment 1, an exhaust gas discharged from an internal combustion engine is adopted as a gas to be detected, and an air-fuel ratio detection means for detecting the oxygen concentration (air-fuel ratio: A/F) in the gas is embodied; the result of detection of the air-fuel ratio is utilized in an air-fuel ratio control system configured with an ECU and the like. In the air-fuel ratio control system, there are realized stoichiometric combustion control in which an air-fuel ratio is feedback-controlled in the vicinity of the stoichiometry, lean combustion control in which an air-fuel ratio is feedback-controlled in a predetermined lean region, and the like.

Additionally, in Embodiment 1, in order to perform wide-range air-fuel ratio detection for dealing with recent or future exhaust gas restrictions and abnormality detection restrictions (OBD) and to control the discharge of NOx occluded by NOx-occlusion/reduction-type catalyst provided in an air-discharging system, sulfur poisoning regeneration, and the like, an air-fuel ratio can be detected in a wide range from a rich region (e.g., A/F 10) to an atmospheric state (e.g., A/F 50).

Figure 1:
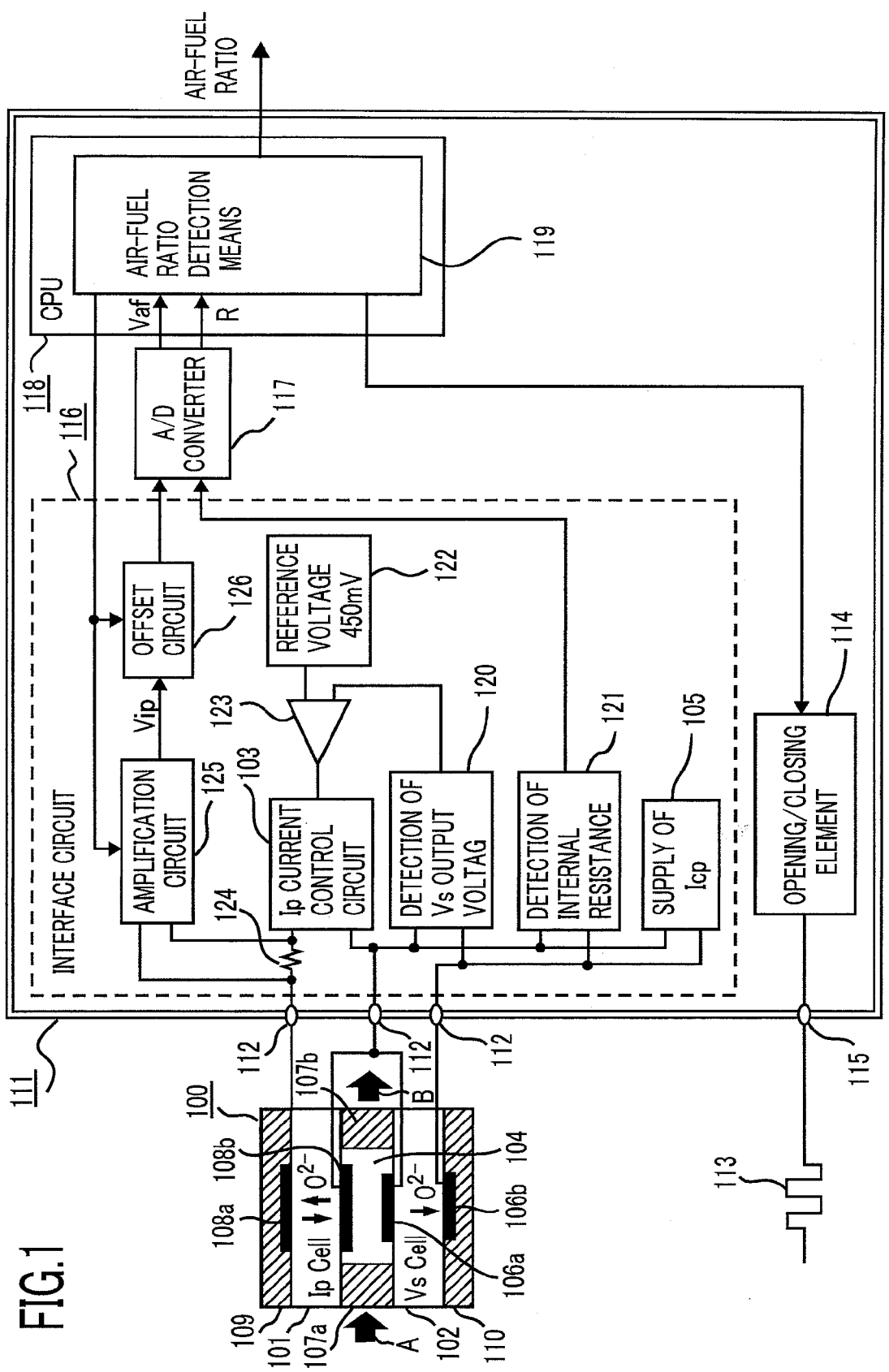
FIG. 1 is a block configuration diagram illustrating the outline of an internal-combustion-engine control apparatus according to Embodiment 1 of the present invention.

At first, the configuration of an internal-combustion-engine control apparatus will be explained. FIG. 1 is a block diagram illustrating an internal-combustion-engine control apparatus.

In FIG. 1, an exhaust-gas sensor 100 has a laminated sensor element; an oxygen pump element (Ip cell) 101 and an oxygen concentration cell element (Vs cell) 102 are each formed of a zirconia solid electrolyte.

The oxygen pump element 101 pumps up from or supplies into a gas detection chamber 104 oxygen $O_2$ in a quantity corresponding to the polarity and the magnitude of a pump current Ip supplied by a pump current control circuit 103 described later. Assuming that cell element electrodes 106a and 106b are oxygen references, the oxygen concentration cell element 102 generates a voltage Vs, between cell element terminals, corresponding to the oxygen concentration of the gas detection chamber 104, based on an oxygen reference creation current Icp supplied by an oxygen reference creation current supply circuit 105 described later.

A pair of gas passage walls 107a and 107b are each formed of a gas diffusion porous material and disposed between the oxygen pump element 101 and the oxygen concentration cell element 102. The gas detection chamber 104 is formed of a pair of gas passage walls 107a and 107b, the oxygen pump element 101, and the oxygen concentration cell element 102. The arrows A and B indicate the direction in which an exhaust gas passes in the gas detection chamber 104; as indicated by the arrows A and B, part of an exhaust-gas flow is introduced from the gas passage wall 107a into the gas detection chamber 104, passes through the gas passage wall 107b, and then is discharged outward the exhaust-gas sensor 100.

A pair of pump element electrodes 108a and 108b are disposed on respective sides of the oxygen pump element 101 in such a way as to face each other; the pump element electrode 108a is protected by a first protection layer 109.

A pair of cell element electrodes 106a and 106b are disposed on respective sides of the oxygen concentration cell element 102 in such a way as to face each other; the cell element electrode 106a is protected by a second protection layer 110. The electrodes 108a, 108b, 106a, and 106b are connected with control terminals 112 of an exhaust gas sensor control device 111.

The cell element electrodes 106a and 106b of the oxygen concentration cell element 102 are connected with the oxygen reference creation current supply circuit 105 in the exhaust gas sensor control device 111; Assuming that cell element electrode 106b is an oxygen reference, the voltage Vs, between cell element terminals, corresponding to the oxygen concentration of the gas detection chamber 104 is generated, based on an oxygen reference creation current Icp supplied by the oxygen reference creation current supply circuit 105 described later.

The pump element electrodes 108a and 108b of the oxygen pump element 101 are connected with the pump current control circuit 103 in the exhaust gas sensor control device 111; oxygen $O_2$ in a quantity corresponding to the polarity and the magnitude of the pump current Ip supplied by the pump current control circuit 103 is pumped up from or supplied into the gas detection chamber 104. As a result, oxygen is discharged from or supplied to the gas detection chamber 104 so that the oxygen concentration of the gas detection chamber 104 becomes equal to a specified value. Accordingly, the exhaust-gas sensor 100 functions as a sensor that can measure the oxygen concentration of the gas detection chamber 104, by detecting a pump current.

In order to activate the exhaust-gas sensor 100, it is required to maintain the temperatures of the oxygen pump element 101 and the oxygen concentration cell element 102 at 600° C. or higher. Accordingly, in Embodiment 1, the exhaust-gas sensor 100 is heated up to a temperature within an activation temperature range, through heating control of an electric heater 113 as a heating means. In addition, the electric heater 113 undergoes opening and closing control by an opening/closing element 114, via an output terminal 115.

The exhaust gas sensor control device 111 is provided with an interface circuit 116, an A/D converter 117, and a microprocessor (referred to as a CPU, hereinafter) 118; an electric signal detected by the interface circuit 116 is received by the CPU 118, via the A/D converter 117, and in an air-fuel ratio detection means 119 in the CPU 118, calculations of an air-fuel ratio and an element resistance are performed. In Embodiment 1, the A/D converter 117 has a 10-bit resolution and the operation voltage range thereof is from 0 V to 5 V. An air-fuel ratio detected by the air-fuel ratio detection means 119 is outputted, for example, to an unillustrated ECU and utilized in air-fuel ratio feedback control.

In the interface circuit 116, the oxygen reference creation current supply circuit 105 supplies a minute electric current of 10 μA to 25 μA to the oxygen concentration cell element 102, and the cell element electrode 106b is set as an oxygen reference. The detection circuit 120 for the voltage across the cell element terminals detects a cell element output voltage Vs, which is a voltage across the terminals of the oxygen concentration cell element 102. In addition, as the cell element output voltage Vs, a reference voltage of 450 mV is generated at the theoretical air-fuel ratio (A/F=14.6).

Figure 2:
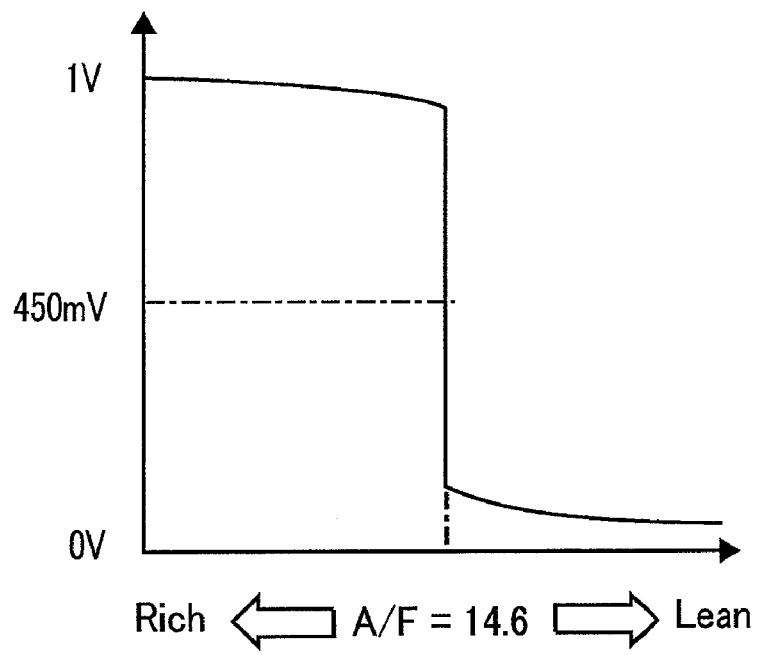
FIG. 2 is an explanatory graph representing the characteristics of the voltage Vs across the cell element terminals of an exhaust-gas sensor according to Embodiment 1 of the present invention.

FIG. 2 is an explanatory graph representing the output characteristics of the detection circuit 120 for the voltage across the cell element terminals; in FIG. 2, the abscissa denotes the air-fuel ratio (rich, lean, or theoretical air-fuel ratio), and the ordinate denotes the cell element output voltage Vs.

In FIG. 1 again, an internal resistance detection circuit 121 detects an internal resistance value R of the oxygen concentration cell element 102. The internal resistance detection circuit 121 periodically performs short-period sampling in a period of approximately 100 msec so as to measure a high-frequency voltage V corresponding to a supplied constant high-frequency current I0, and calculates the internal resistance value R, based on an internal impedance Z0 (Z0=V/I0) given by the ratio of the high-frequency voltage V to the constant high-frequency current I0. In addition, the internal resistance value R is measured by use of the high-frequency current so that the effect of an electrode interface resistance is eliminated. As is well known, because a relatively high electrostatic capacitance parasitizes an electrode interface resistance in a parallel manner, the electrode interface resistance is inclined to have a low impedance against a high-frequency current.

In the case where a high-frequency current I is measured while the constant high-frequency voltage V0 is applied, it is required to perform a ratio calculation of an impedance Z (Z=V0/I); however, in the case where, as described above, a power-supply voltage V is measured while the constant high-frequency current I0 is supplied, the impedance Z0 becomes nearly equal to V, whereby no complicated ratio calculation is required.

Based on the internal resistance value R, the air-fuel ratio detection means 119 performs activation determination of whether or not the temperature of the exhaust-gas sensor 100 is close to the activation temperature; in the case where the temperature of the exhaust-gas sensor 100 is close to the activation temperature, the air-fuel ratio detection means 119 determines that the exhaust-gas sensor 100 is in an activation state, and permits the drive of the pump current control circuit 103; in the case where the temperature of the exhaust-gas sensor 100 is not close to the activation temperature, the air-fuel ratio detection means 119 determines that the exhaust-gas sensor 100 is in a non-activation state, and prohibits the drive of the pump current control circuit 103.

A reference-voltage generation circuit 122 in the interface circuit 116 generates a reference voltage value of 450 mV as a target value of the cell element output voltage Vs.

A comparison control circuit 123 compares the output of the detection circuit 120 for the voltage across the cell element terminals with the reference voltage from the reference-voltage generation circuit 122 and controls the pump current control circuit 103, based on the result of the comparison. In other words, the comparison control circuit 123 controls the pump current control circuit 103 in such a way that the cell element output voltage Vs detected by the detection circuit 120 for the voltage across the cell element terminals becomes equal to the reference voltage value of 450 mV; the oxygen concentration value of the gas detection chamber 104 is detected based on the value of the pump current Ip required for the control.

Figure 3:
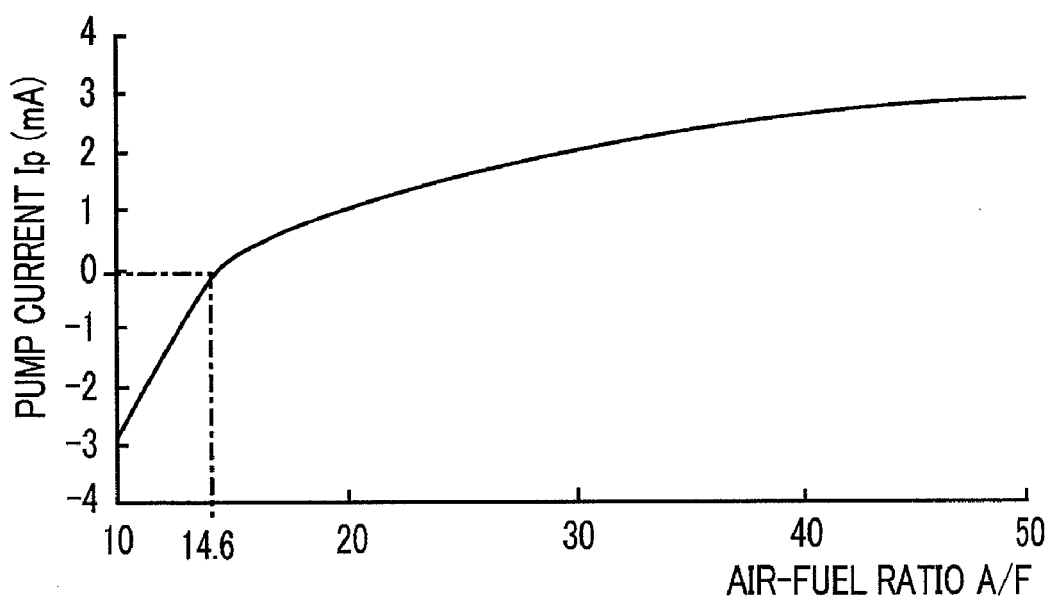
FIG. 3 is an explanatory graph representing the characteristics of the pump current vs. the air-fuel ratio of an exhaust-gas sensor according to Embodiment 1 of the present invention.

FIG. 3 is an explanatory graph representing the relationship between the air-fuel ratio A/F and the pump current Ip.

In FIG. 1 again, an amplification circuit 125 is connected across the current detection resistor 124. The amplification factor G of the amplification circuit 125 is switchable; based on the amplification factor G designated by the air-fuel ratio detection means 119, a signal Vip (referred to as a signal Vip, hereinafter), corresponding to the amplified pump current Ip, which is given by the following equation, is outputted from the amplification circuit 125.

$$Vip = Ip \times Rd \times G$$

where Rd is the resistance value of the current detection resistor 124.

Because the pump current Ip is a current having positive and negative polarities with respect to the stoichiometry (theoretical air-fuel ratio), the signal Vip is a voltage having positive and negative polarities with respect to the stoichiometry; therefore, as represented by the following equation, by adding an offset voltage Vofs to the signal Vip in the offset circuit 126, an air-fuel ratio signal Vaf becomes a signal that falls within 0 V to 5 V, which is the operating voltage range of the A/D converter 117, and the signal Vip becomes a signal that can be received by the air-fuel ratio detection means 119, through the A/D converter 117

$$Vaf = Vip + Vofs$$

The offset voltage Vofs is a reference voltage for calculating the signal Vip from the air-fuel ratio signal Vaf; therefore, it is required to learn the variation in the offset voltage Vofs.

Because, when the operation of the pump current control circuit 103 stops, the pump current Ip becomes 0 mA, Vip is equal to 0 V and the air-fuel ratio signal Vaf indicates the offset voltage Vofs; therefore, the learning of the offset voltage Vofs is performed based on the air-fuel ratio signal Vaf at the time when the operation of the pump current control circuit 103 stops.

Next, the abnormality determination method in the exhaust gas sensor control device 111 will be explained.

Because, when the exhaust-gas sensor 100 is in a non-activation state, the air-fuel ratio signal Vaf indicates the offset voltage Vofs, abnormality determination of the offset circuit 126 can be performed based on whether or not the air-fuel ratio signal Vaf is within a range in which the offset voltage Vofs is normal.

When the exhaust-gas sensor 100 is in an activation state in which the drive of the pump current control circuit 103 is permitted, the air-fuel ratio signal Vaf is signal corresponding to the air-fuel ratio because the pump current Ip varies as the air-fuel ratio of an exhaust gas varies. Accordingly, when the exhaust-gas sensor 100 is in an activation state, by stopping the drive of the pump current control circuit 103 every predetermined time so as to make the pump current Ip to be 0 mA, abnormality determination of the offset circuit 126 is performed based on the air-fuel ratio signal Vaf.

As far as the amplification circuit 125 is concerned, when the exhaust-gas sensor 100 is in a non-activation state in which the drive of the pump current control circuit 103 is prohibited, the pump current Ip becomes 0 mA, whereby the signal Vip is 0 V regardless of the amplification factor G. Therefore, even if the amplification factor G of the amplification circuit 125 is changed, the value of the air-fuel ratio signal Vaf is equal to the value of the offset voltage Vofs; thus, abnormality determination of the amplification circuit 125 cannot be performed.

In contrast, when the exhaust-gas sensor 100 is in an activation state in which the drive of the pump current control circuit 103 is permitted, the air-fuel ratio signal Vaf becomes a value corresponding to the air-fuel ratio of an exhaust gas. In this situation, in a normal state, the deviation in the air-fuel ratio signal Vaf detected through changing the amplification factor G of the amplification circuit 125 becomes a value obtained by adding the deviation of the offset voltage in each of the amplification factors and the deviation of the signal Vip; in an abnormal state, the deviation in the deviation of the air-fuel ratio signal Vaf becomes nothing but the deviation of the offset voltage. However, even in a normal state, when the stoichiometry (theoretical air-fuel ratio) is satisfied, the pump current Ip becomes 0 mA, whereby the deviation in the air-fuel ratio signal Vaf becomes a value the same as that in an abnormal state; therefore, in the determination through the deviation of the air-fuel ratio signal Vaf, it is required to take the stoichiometric state into account. Accordingly, in the abnormality determination according to Embodiment 1, an estimated pump current is calculated through the air-fuel ratio signal Vaf, based on the following equation, and based on the deviation of the estimated pump current, abnormality determination is performed.

$$\text{Estimated pump current} = (Vip - Vofs) \div Rd \div G$$

In the abnormality determination based on the estimated pump current, in a normal state, even in the case where the stoichiometry is satisfied, the deviation of the pump current becomes "0", therefore, the difference Vip−Vofs causes a deviation of the estimated pump current. Therefore, when the estimated pump current becomes a predetermined value or larger, it is determined that there exists an abnormality, so that it is made possible to perform abnormality determination without taking the stoichiometry into account.

Next, the operation will be explained while showing specific values. For example, in the case where air-fuel ratio detection is performed by switching a near-stoichiometry region (A/F=13 to 20) including the stoichiometry and an whole air-fuel ratio region (A/F=10 to 50), the amplification factor G1 in the near-stoichiometry region including the stoichiometry is set to 4.5, and the amplification factor G2 in the whole air-fuel ratio region (A/F=10 to 50) is set to 1.5. Additionally, the resistance value Rd of the current detection resistor 124 is set to 300Ω.

The range of the signal Vip in the near-stoichiometry region (A/F=13 to 20) including the stoichiometry is obtained as follows:

When A/F=13, the pump current Ip=−0.83 mA; thus, Vip=−0.83 mA×300Ω×4.5=−1.121 V.

When A/F=20, the pump current Ip=1.05 mA; thus, Vip=1.05 mA×300Ω×4.5=1.418 V.

As a result, the voltage range of the signal Vip in the case where the amplification factor G1 is 4.5 is from −1.121 V to 1.418 V.

Additionally, the range of the signal Vip in the whole air-fuel ratio region (A/F=10 to 50), which is equivalent to air-fuel ratio detection capable range, is obtained as follows:

When A/F=10, the pump current Ip=−2.92 mA; thus, Vip=−2.92 mA×300Ω×1.5=−1.314 V.

When A/F=50, the pump current Ip=2.81 mA; thus, Vip=2.81 mA×300Ω×1.5=1.265V.

Accordingly, the detection voltage becomes 1.265 V (=2.81 mA×300Ω×1.5). As a result, the voltage range of the signal Vip in the case where the amplification factor G2 is 1.5 is from −1.314 V to 1.265 V.

Because, as described above, the operating voltage range of the A/D converter 117 is from 0 V to 5 V, the A/D converter 117 can AD-convert the signal Vip over the whole region. Accordingly, in order to make the air-fuel ratio signal Vaf fall within the operating voltage range of the A/D converter 117, i.e., 0 V to 5 V, it is required to set the offset voltage Vofs at each off the amplification factor G1 and G2 to be within the following range.

The setting range of the offset voltage Vofs at the amplification factor G1: 1.121 V to 3.582 V The setting range of the offset voltage Vofs at the amplification factor G2: 1.314 V to 3.735 V In this situation, for example the offset voltage Vofs_G1 at the amplification factor G1 is set to 2.0 V and the offset voltage Vofs_G2 at the amplification factor G2 is set to 2.5 V, and the normal range of the offset voltage Vofs_G1 is set to be from 1.9 V to 2.1 V and the normal range of the offset voltage Vofs_G2 is set to be from 2.4 V to 2.6 V so that the air-fuel ratio signal Vaf_G2 at the amplification factor G2 falls within the operating voltage range of the A/D converter 117, i.e., 0 V to 5 V, over the whole air-fuel ratio detection range, and that the offset voltage can be discriminated through the amplification factor.

In this situation, the air-fuel ratio signal Vaf_G1 at the amplification factor G1 and the air-fuel ratio signal Vaf_G2 at the amplification factor G2 in the respective air-fuel ratio detection range are given as follows:

The range of the air-fuel ratio signal Vaf_G1 at the amplification factor G1: 0.879 V to 3.418 V The range of the air-fuel ratio signal Vaf_G2 at the amplification factor G2: 1.186 V to 3.765 V As a result, the air-fuel ratio signal Vaf_G2 at the amplification factor G2 is within the operating voltage range of the A/D converter 117, i.e., 0 V to 5 V and within 0 V to 5 V over the whole detection range of the air-fuel ratio sensor 100; therefore, the normal range of the air-fuel ratio signal Vaf_G2 can be set to be from 0.5 V to 4.5 V. The air-fuel ratio signal Vaf_G1 at the amplification factor G1 is out of a range from 0 V to 5 V over the whole air-fuel ratio region (A/F=10 to 50).

Because, when the drive of the pump current control circuit 103 is stopped, the pump current Ip becomes 0 mA, the air-fuel ratio signal Vaf_G1 at the amplification factor G1 and the air-fuel ratio signal Vaf_G2 at the amplification factor G2 are given by the following equations:

$$Vaf\_G1 = 2.0\,V + (0\,mA \times 300\Omega) \times 4.5 = 2.0\,V$$

$$Vaf\_G2 = 2.5\,V + (0\,mA \times 300\Omega) \times 1.5 = 2.5\,V$$

Accordingly, the values of the air-fuel ratio signals Vaf_G1 and Vaf_G2 are within the respective normal ranges of the offset voltages Vofs_G1 and Vofs_G2.

For example, in the case where, due to an abnormality in the offset circuit 126, the offset voltage is not switched over from Vofs_G1, the air-fuel ratio signals Vaf_G1 and Vaf_G2 are given as follows:

Vaf_G1=2.0 V

Vaf_G2=2.0 V

Accordingly, the value of the air-fuel ratio signals Vaf_G2 is out of the normal range of the offset voltage Vofs_G2; therefore, an abnormality can be detected.

Similarly, in the case where, due to an abnormality in the offset circuit 126, the offset voltage is not switched over from Vofs_G2, the air-fuel ratio signals Vaf_G1 and Vaf_G2 are given as follows:

Vaf_G1=2.5 V

Vaf_G2=2.5 V

Accordingly, the value of the air-fuel ratio signals Vaf_G1 is out of the normal range of the offset voltage Vofs_G1; therefore, an abnormality can be detected.

Next, when the sensor is in an activation state, the pump current Ip is decided by the air-fuel ratio; for example, in the case where A/F is 14, the pump current Ip becomes −0.27 mA;

therefore, the air-fuel ratio signal Vaf_G1 at the amplification factor G1 and the air-fuel ratio signal Vaf_G2 at the amplification factor G2 are given by the following equations:

$$Vaf\_G1=2.0\ V+(-0.27\ mA\times300\Omega)\times4.5=1.6355\ V$$

$$Vaf\_G2=2.5\ V+(-0.27\ mA\times300\Omega)\times1.5=2.3785\ V$$

Accordingly, the estimated pump currents Ip_G1 and Ip_G2 are calculated based on the air-fuel ratio signals Vaf_G1 and Vaf_G2, respectively, as follows:

$$Ip\_G1=(1.6355\ V-2.0\ V)\div4.5\div300\Omega=-0.27\ mA$$

$$Ip\_G2=(2.3785\ V-2.5\ V)\div1.5\div300\Omega=-0.27\ mA$$

Accordingly, as given below, the difference between the estimated pump currents Ip_G1 and Ip_G2 becomes 0 mA in the case where the air-fuel ratio signals Vaf_G1 and Vaf_G2 at the respective amplification factors are normal.

$$|Ip\_G1-Ip\_G2|=|(-0.27\ mA)-(-0.27\ mA)|=0\ mA$$

For example, in the case where, due to an abnormality in the amplification circuit 125, the amplification factor is fixed to G1, the air-fuel ratio signals Vaf_G1 and Vaf_G2 are given as follows:

$$Vaf\_G1=2.0\ V+(-0.27\ mA\times300\Omega)\times4.5=1.6355\ V$$

$$Vaf\_G2=2.5\ V+(-0.27\ mA\times300\Omega)\times4.5=2.1355\ V$$

Accordingly, the estimated pump currents Ip_G1 and Ip_G2 are calculated based on the air-fuel ratio signals Vaf_G1 and Vaf_G2, respectively, as follows:

$$Ip\_G1=(1.6355\ V-2.0\ V)\div4.5\div300\Omega=-0.27\ mA$$

$$Ip\_G2=(2.1355\ V-2.5\ V)\div1.5\div300\Omega=-0.81\ mA$$

Accordingly, the difference between the estimated pump currents Ip_G1 and Ip_G2 occurs as follows; therefore, an abnormality can be detected.

$$|Ip\_G1-Ip\_G2|=|(-0.27\ mA)-(-0.81\ mA)|=0.54\ mA$$

In the case where, due to an abnormality in the amplification circuit 125, the amplification factor is fixed to G2, the air-fuel ratio signals Vaf_G1 and Vaf_G2 are given as follows:

$$Vaf\_G1=2.0\ V+(-0.27\ mA\times300\Omega)\times1.5=1.8785\ V$$

$$Vaf\_G2=2.5\ V+(-0.27\ mA\times300\Omega)\times1.5=2.3785\ V$$

Accordingly, the estimated pump currents Ip_G1 and Ip_G2 are calculated based on the air-fuel ratio signals Vaf_G1 and Vaf_G2, respectively, as follows:

$$Ip\_G1=(1.8785\ V-2.0\ V)\div4.5\div300\Omega=-0.09\ mA$$

$$Ip\_G2=(2.3785\ V-2.5\ V)\div1.5\div300\Omega=-0.27\ mA$$

Accordingly, the difference between the estimated pump currents Ip_G1 and Ip_G2 occurs as follows; therefore, an abnormality can be detected.

$$|Ip\_G1-Ip\_G2|=|(-0.09\ mA)-(-0.27\ mA)|=0.18\ mA$$

For example, when A/F is 30, the pump current Ip becomes 2.02 mA; therefore, the air-fuel ratio signal Vaf_G1 at the amplification factor G1 and the air-fuel ratio signal Vaf_G2 at the amplification factor G2 are given by the following equations:

$$Vaf\_G1=2.0\ V+(2.02\ mA\times300\Omega)\times4.5=4.727\ V$$

$$Vaf\_G2=2.5\ V+(2.02\ mA\times300\Omega)\times1.5=3.409\ V$$

Accordingly, the estimated pump currents Ip_G1 and Ip_G2 are calculated based on the air-fuel ratio signals Vaf_G1 and Vaf_G2, respectively, as follows:

$$Ip\_G1=(4.727\ V-2.0\ V)\div4.5\div300\Omega=2.02\ mA$$

$$Ip\_G2=(3.109\ V-2.5\ V)\div1.5\div300\Omega=2.02\ mA$$

Accordingly, as given below, the difference between the estimated pump currents Ip_G1 and Ip_G2 becomes 0 mA in the case where the air-fuel ratio signals Vaf_G1 and Vaf_G2 at the respective amplification factors are normal.

$$|Ip\_G1-Ip\_G2|=|2.02\ mA-2.02\ mA|=0\ mA$$

For example, in the case where, due to an abnormality in the amplification circuit 125, the amplification factor is fixed to G1, the air-fuel ratio signals Vaf_G1 and Vaf_G2 are given as follows:

$$Vaf\_G1=2.0\ V+(2.02\ mA\times300\Omega)\times4.5=4.727\ V$$

$$Vaf\_G2=2.5\ V+(2.02\ mA\times300\Omega)\times4.5=5.227\ V$$

In this case, the air-fuel ratio signal Vaf_G2 is out of the normal range; therefore, an abnormality can be detected.

In the case where, due to an abnormality in the amplification circuit 125, the amplification factor is fixed to G2, the air-fuel ratio signals Vaf_G1 and Vaf_G2 are given as follows:

$$Vaf\_G1=2.0\ V+(2.02\ mA\times300\Omega)\times1.5=2.909\ V$$

$$Vaf\_G2=2.5\ V+(2.02\ mA\times300\Omega)\times1.5=3.409\ V$$

Accordingly, the estimated pump currents Ip_G1 and Ip_G2 are calculated based on the air-fuel ratio signals Vaf_G1 and Vaf_G2, respectively, as follows:

$$Ip\_G1=(2.909\ V-2.0\ V)\div4.5\div300\Omega=0.67\ mA$$

$$Ip\_G2=(3.409\ V-2.5\ V)\div1.5\div300\Omega=2.02\ mA$$

Accordingly, the difference between the estimated pump currents Ip_G1 and Ip_G2 occurs as follows; therefore, an abnormality can be detected.

$$|Ip\_G1-Ip\_G2|=|0.67\ mA-2.02\ mA|=1.35\ mA$$

Figure 4:
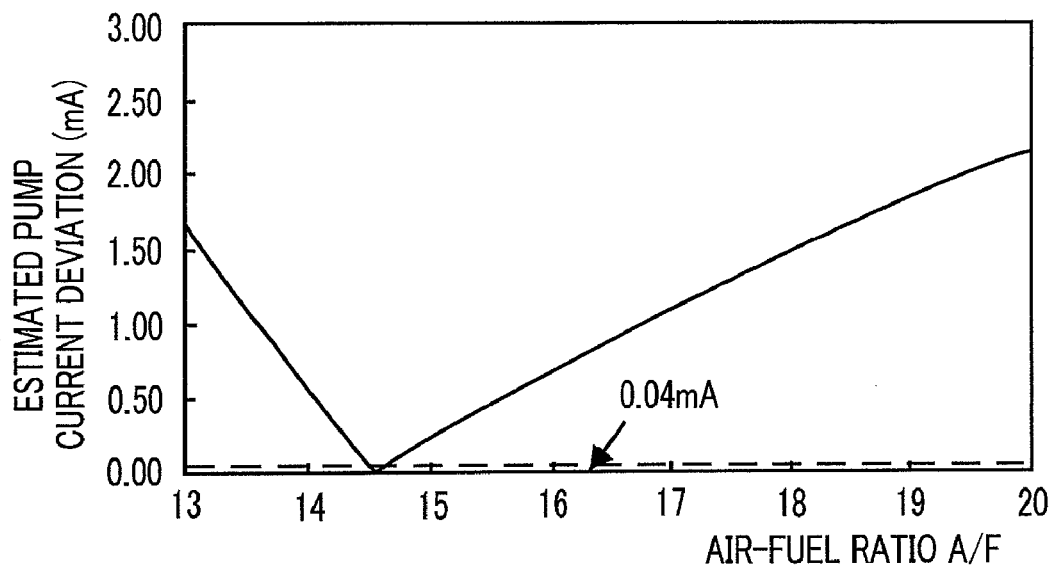
FIG. 4 is a graph representing the difference between estimated pump currents, according to Embodiment 1 of the present invention, in the case where the amplification factor is fixed to G1.
Figure 5:
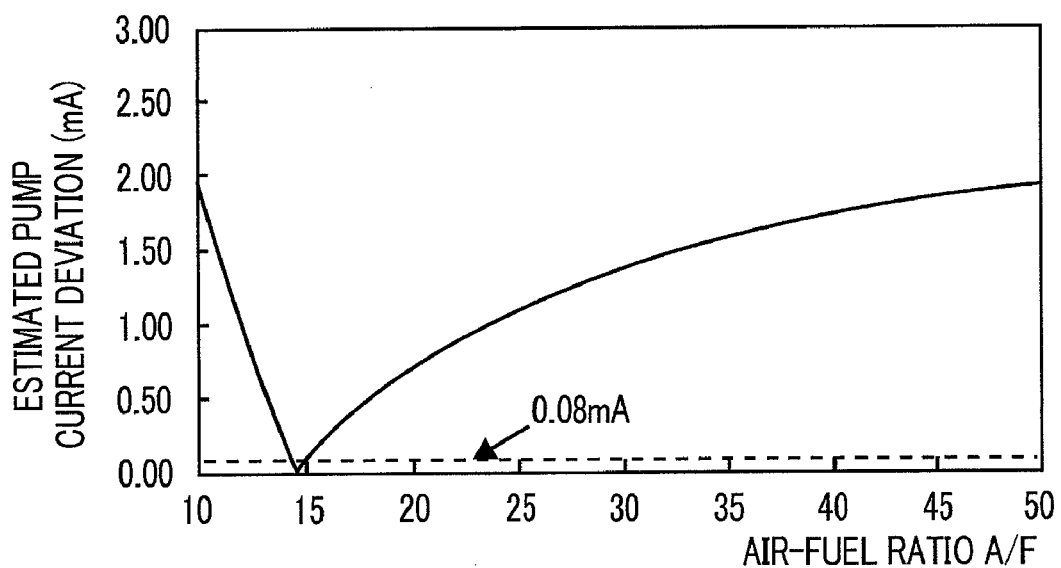
FIG. 5 is a graph representing the difference between estimated pump currents, according to Embodiment 1 of the present invention, in the case where the amplification factor is fixed to G2.

FIG. 4 is an explanatory graph representing the relationship between the air-fuel ratio signal Vaf and the difference between the estimated pump currents in the case where the amplification factor is fixed to G1; FIG. 5 is an explanatory graph representing the relationship between the air-fuel ratio signal Vaf and the difference between the estimated pump currents in the case where the amplification factor is fixed to G2. As can be seen from FIGS. 4 and 5, except for the stoichiometry in which the pump current Ip becomes 0 mA, in the case where an abnormality occurs in the amplification circuit 125, a difference between the estimated pump currents occurs; thus, the abnormality can be detected.

Next, the specific operation of the exhaust gas sensor control device 111 configured as described above will be explained.

Figure 6A:
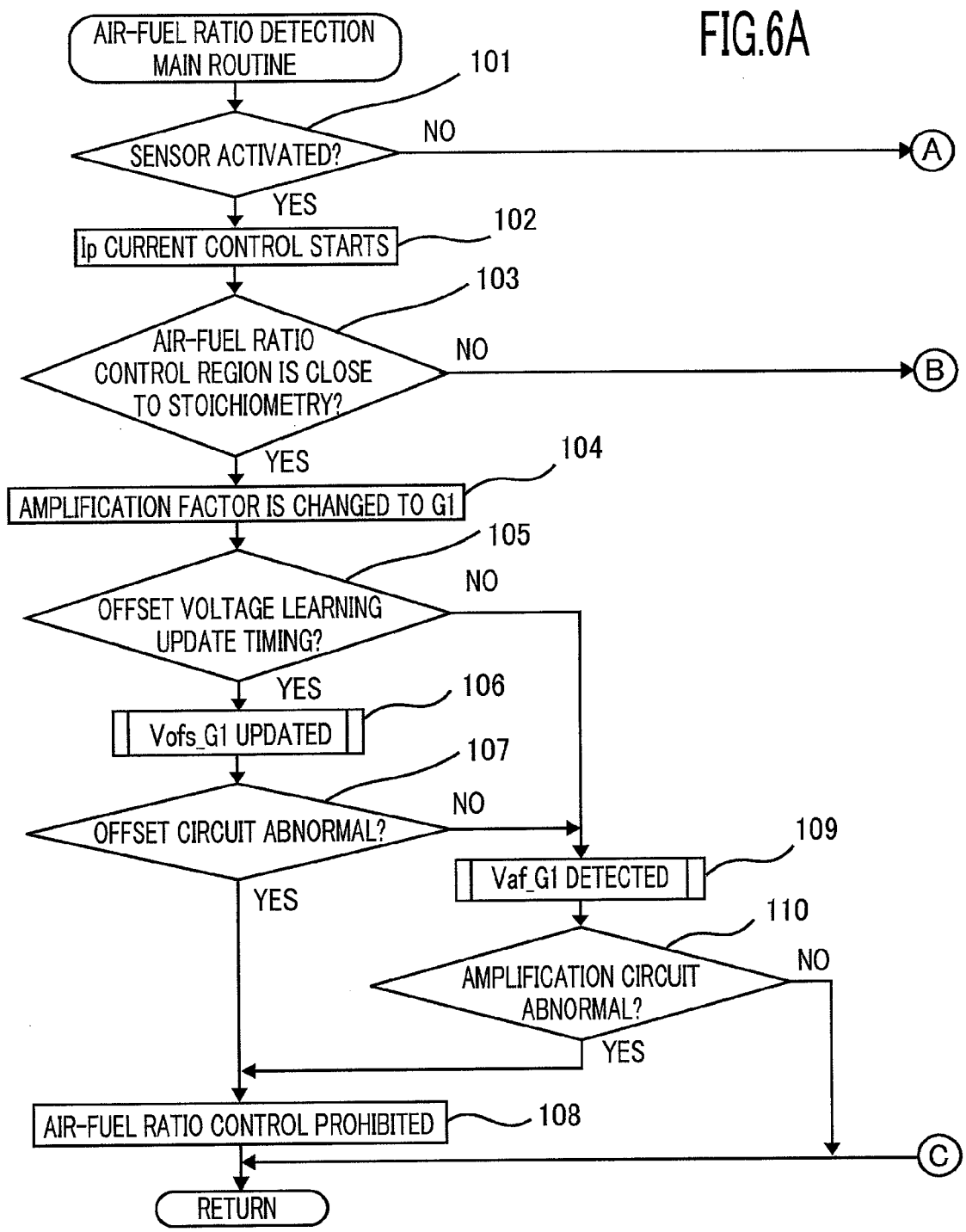
FIG. 6 is a flowchart representing the processing flow of a main routine, for air-fuel ratio detection, according to Embodiment 1 of the present invention.

FIG. 6 is a flowchart representing a routine for detection of an air-fuel ratio performed by the air-fuel ratio detection means 119 and routines for detecting abnormalities in the offset circuit 126 and the amplification circuit 125; the air-fuel ratio detection means 119 repeatedly performs the foregoing routines in a predetermined cycle (e.g., in a cycle of 10 ms).

After the routine is started, a determination whether or not the sensor is in an activation state is firstly performed in the step 101. In the case where it is determined that the sensor is in an activation state, the step 101 is followed by the step 102; in the case where it is determined that the sensor is in a non-activation state, the step 101 is followed by the step 118. In the case where it is determined in the step 101 that the sensor is in an activation state, the drive of the pump current control circuit 103 is permitted in the step 102.

In the step 103, it is determined whether or not the air-fuel ratio control region is in the vicinity of the stoichiometry; in the case where the air-fuel ratio control region is in the vicinity of the stoichiometry, the step 103 is followed by the step 104; in the case where the air-fuel ratio control region is not in the vicinity of the stoichiometry, the step 111 is followed by the step 111. In the case where it is determined in the step 103 that the air-fuel ratio control region is in the vicinity of the stoichiometry, the amplification factor of the amplification circuit 125 is changed to G1 in the step 104.

In the step 105, it is determined whether or not the present timing is an offset voltage learning update timing; in the case where the present timing is an offset voltage learning update timing, the step 105 is followed by the step 106; in the case where the present timing is not an offset voltage learning update timing, the step 105 is followed by the step 109. In the case where it is determined in the step 105 that the present timing is an offset voltage learning update timing, the step 105 is followed by the step 106 where an update routine, represented in FIG. 7, for the offset voltage Vofs_G1 at the amplification factor G1 is performed.

Figure 7:
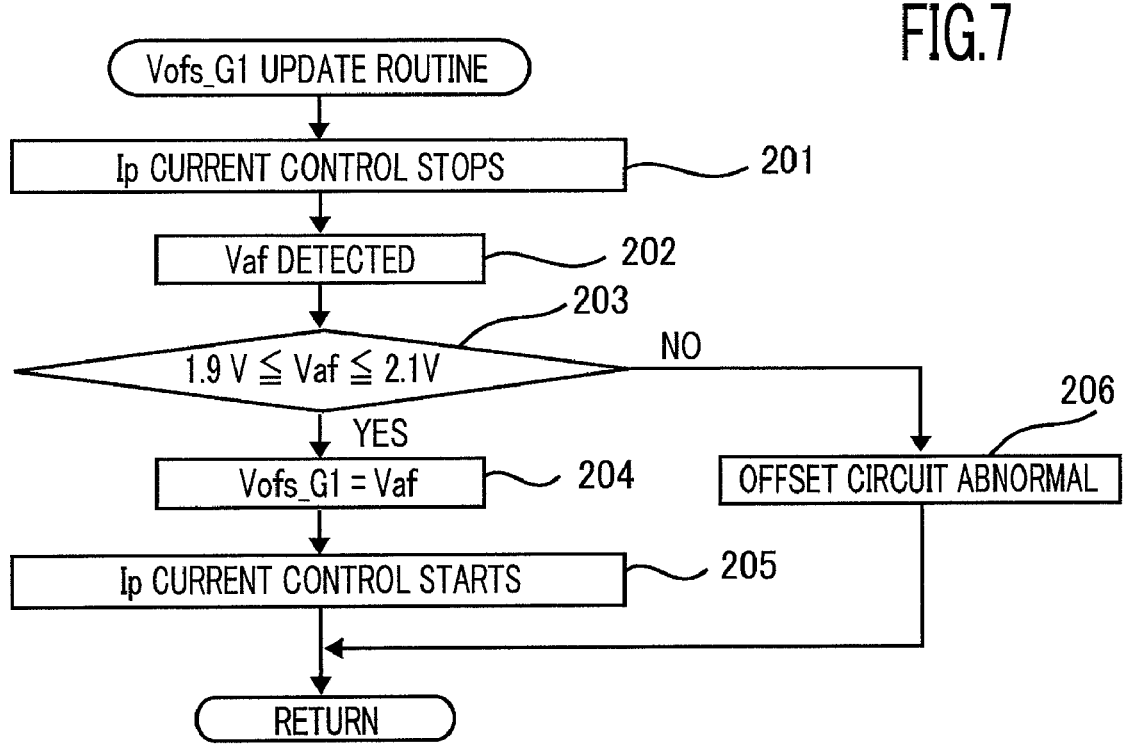
FIG. 7 is a flowchart representing the processing flow of an update routine, for an offset voltage at the amplification factor G1, according to Embodiment 1 of the present invention.

In FIG. 7, in the update routine for the offset voltage Vofs_G1, firstly in the step 201, the drive of the pump current control circuit 103 is stopped so as to make the pump current Ip to be 0 mA, and then the air-fuel ratio signal Vaf is detected in the step 202.

In the step 203, it is determined whether or not the air-fuel ratio signal Vaf is within the normal range (1.9 V≦Vaf≦2.1 V) of the offset voltage at the amplification factor G1; in the case where the air-fuel ratio signal Vaf is within the normal range, the step 203 is followed by the step 204 where the offset voltage Vofs_G1 is updated with the air-fuel ratio signal Vaf; in the step 205, the drive of the pump current control circuit 103 is permitted; the routine is ended; then, the step 205 is followed by the step 107 in FIG. 6. In contrast, in the case where the air-fuel ratio signal Vaf is not within the normal range, i.e., in the case where 1.9 V>Vaf or Vaf>2.1 V, the step 203 is followed by the step 206 where it is determined whether or not the offset is abnormal; the routine is ended; then, the step 206 is followed by the step 107 in FIG. 6.

In FIG. 6 again, in the step 107, it is determine whether or not the offset is abnormal; in the case where the offset is abnormal, the step 107 is followed by the step 108; in the case where the offset is not abnormal, the step 107 is followed by the step 109. In the case where an abnormality occurs in the offset voltage, air-fuel ratio control cannot be performed through the air-fuel ratio signal Vaf; therefore, in the step 108, the air-fuel ratio control is prohibited, and then the routine is ended. In contrast, in the case where, in the step 105, the present timing is not the offset voltage learning update timing, or in the case where, in the step 107, the offset is not abnormal, the step 105 or the step 107 is followed by the step 109 where a detection routine, represented in FIG. 8, for the air-fuel ratio signal Vaf_G1 at the amplification factor G1 is performed.

Figure 8:
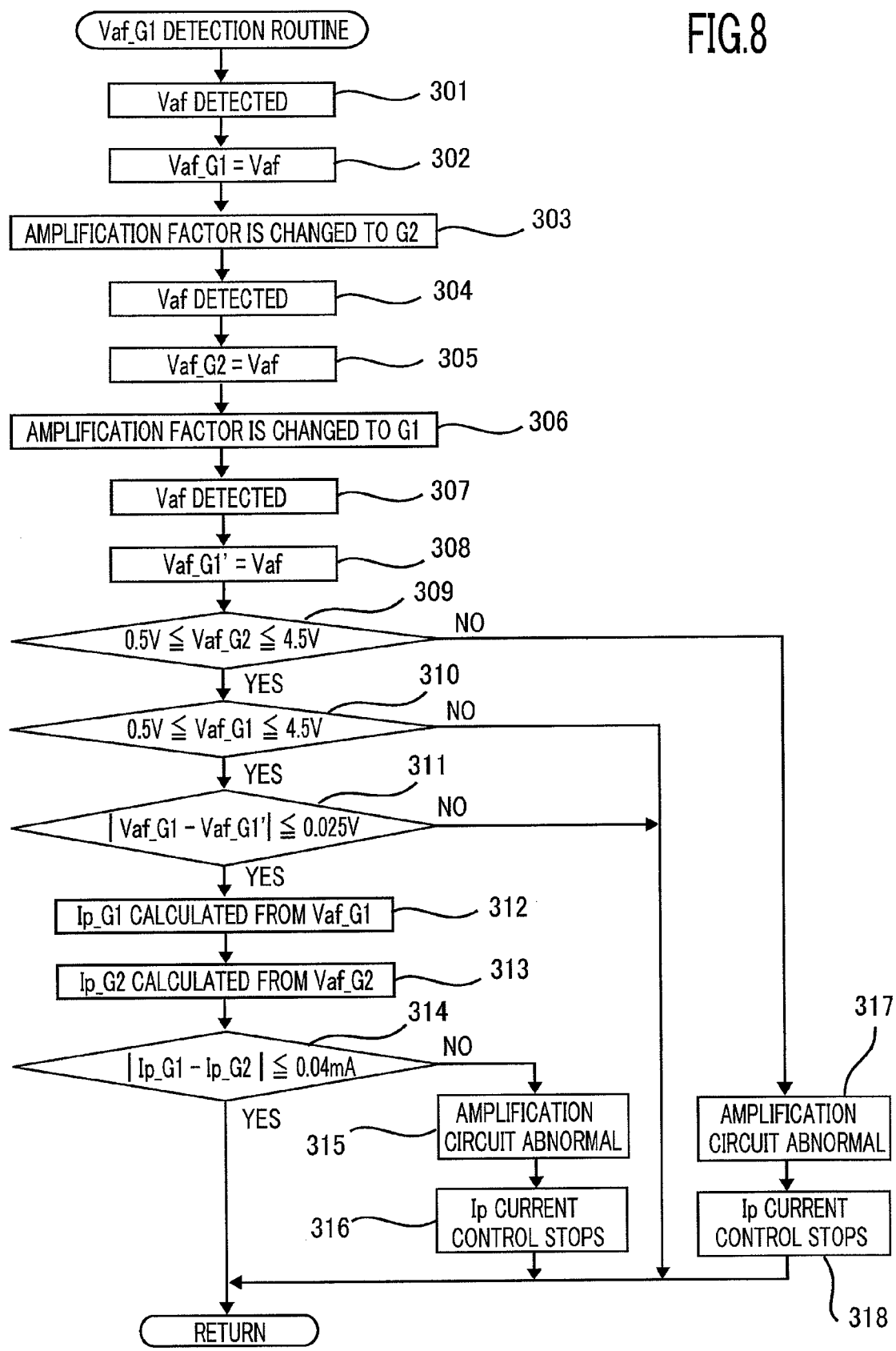
FIG. 8 is a flowchart representing the processing flow of a detection routine, for an air-fuel ratio signal at the amplification factor G1, according to Embodiment 1 of the present invention.

In FIG. 8, in the detection routine for the air-fuel ratio signal Vaf_G1, detection of the air-fuel ratio signal Vaf is performed in the step 301; then, the air-fuel ratio signal Vaf_G1 is updated with Vaf in the step 302.

In the step 303, the amplification factor of the amplification circuit 125 is changed to G2; in the step 304, the air-fuel ratio signal Vaf is detected; then, the air-fuel ratio signal Vaf_G2 is updated with Vaf in the step 305.

In the step 306, the amplification factor of the amplification circuit 125 is changed to G1; in the step 307, the air-fuel ratio signal Vaf is detected; then, the air-fuel ratio signal Vaf_G1' is updated with Vaf in the step 308.

In the step 309, it is determined whether or not the air-fuel ratio signal Vaf_G2 at the amplification factor G2 is within the normal range (0.5 V≦Vaf_G2≦4.5 V); in the case where the air-fuel ratio signal Vaf_G2 is within the normal range, the step 309 is followed by the step 310. In the case where the air-fuel ratio signals Vaf_G2 is not within the normal range, i.e., in the case where 0.5 V>Vaf_G2 or Vaf_G2>4.5 V, it is conceivable that an abnormality has occurred in the amplification circuit 125; therefore, in the step 317, it is determined that the amplification circuit is abnormal. In the step 318, the drive of the pump current control circuit 103 is stopped; the routine is ended; then, the step 318 is followed by the step 110 in FIG. 6.

In the step 310, it is determined whether or not the air-fuel ratio signal Vaf_G1 at the amplification factor G1 is within an estimated pump current calculable range (0.5 V≦Vaf_G1≦4.5 V); in the case where the air-fuel ratio signal Vaf_G1 is within the estimated pump current calculable range, the step 310 is followed by the step 311. In the case where the air-fuel ratio signals Vaf_G1 is not within the estimated pump current calculable range, i.e., in the case where 0.5 V>Vaf_G1 or Vaf_G1>4.5 V, the estimated pump current at the amplification factor G1 cannot be calculated because the pump current Ip is large; thus, the routine is ended; then, the step 310 is followed by the step 110 in FIG. 6.

In the step 311, it is determined, through the difference between the air-fuel ratio signals Vaf_G1 and the Vaf_G2, whether or not the variation of the pump current Ip during detection of the air-fuel ratio signal Vaf is within a predetermined range. In the case where the difference between the air-fuel ratio signals is within 0.025 V (the variation width of the pump current Ip is 0.02 mA at the amplification factor G1), it is determined that the air-fuel ratio has not varied, and the step 311 is followed by the step 312. In the case where the difference between the air-fuel ratio signals is the same as or larger than 0.025 V, the variation of the air-fuel ratio affects the estimated pump current; therefore, the routine is ended, and then the step 311 is followed by the step 110 in FIG. 6.

In the step 312, the estimated pump current Ip_G1 is calculated through the air-fuel ratio signal Vaf_G1; in the step 313, the estimated pump current Ip_G2 is calculated through the air-fuel ratio signal Vaf_G2.

In the step 314, it is determined whether or not the difference between the estimated pump currents Ip_G1 and Ip_G2 is within 0.04 mA; in the case where the difference between the estimated pump currents is within 0.04 mA, it is determined that the amplification circuit 125 is normal; the routine is ended; then, the step 314 is followed by the step 110 in FIG. 6. In contrast, in the case where the difference between the estimated pump currents is larger than 0.04 mA, it is conceivable that an abnormality has occurred in the amplification circuit 125; therefore, in the step 315, it is determined that the amplification circuit 125 is abnormal; in the step 316, the drive of the pump current control circuit 103 is stopped; the routine is ended; then, the step 316 is followed by the step 110 in FIG. 6.

In FIG. 6 again, in the step 110, it is determine whether or not the amplification circuit is abnormal; in the case where the amplification circuit is abnormal, the step 110 is followed by the step 108; in the case where the amplification circuit is normal, the routine is ended. In the step 108, in the case where the amplification circuit is abnormal, the air-fuel ratio control cannot be performed through the air-fuel ratio signal Vaf; therefore, the air-fuel ratio control is prohibited, and then the routine is ended.

In the case where it is determined in the step 103 that the air-fuel ratio detection region is not in the vicinity of the stoichiometry, the amplification factor of the amplification circuit 125 is changed to G2 in the step 111.

In the step 112, it is determined whether or not the present timing is an offset voltage learning update timing; in the case where the present timing is an offset voltage learning update timing, the step 112 is followed by the step 113; in the case where the present timing is not an offset voltage learning update timing, the step 112 is followed by the step 116. In the case where it is determined in the step 112 that the present timing is an offset voltage learning update timing, the step 112 is followed by the step 113 where an update routine, represented in FIG. 9, for the offset voltage Vofs_G2 at the amplification factor G2 is performed.

Figure 9:
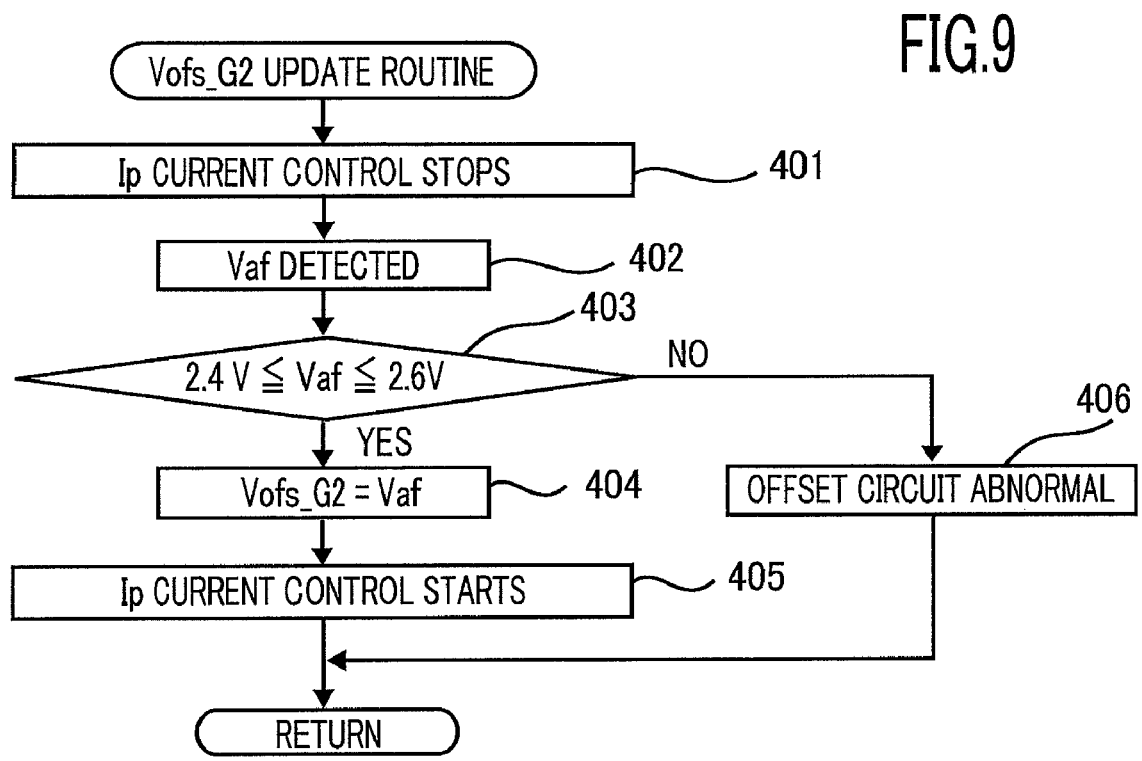
FIG. 9 is a flowchart representing the processing flow of an update routine, for an offset voltage at the amplification factor G2, according to Embodiment 1 of the present invention.

In FIG. 9, in the update routine for the offset voltage Vofs_G2, firstly in the step 401, the drive of the pump current control circuit 103 is stopped so as to make the pump current Ip to be 0 mA, and then the air-fuel ratio signal Vaf is detected in the step 402.

In the step 403, it is determined whether or not the air-fuel ratio signal Vaf is within the normal range (2.4 V≦Vaf≦2.6 V) of the offset voltage at the amplification factor G2; in the case where the air-fuel ratio signal Vaf is within the normal range, the step 403 is followed by the step 404 where the offset voltage Vofs_G2 is updated with the air-fuel ratio signal Vaf; in the step 405, the drive of the pump current control circuit 103 is permitted; the routine is ended; then, the step 405 is followed by the step 114 in FIG. 6. In the case where the air-fuel ratio signals Vaf is not within the normal range, i.e., in the case where 2.4 V>Vaf or Vaf>2.6 V, the step 403 is followed by the step 406 where it is determined whether or not the offset is abnormal; the routine is ended; then, the step 406 is followed by the step 114 in FIG. 6.

In FIG. 6 again, in the step 114, it is determine whether or not the offset is abnormal; in the case where the offset is abnormal, the step 114 is followed by the step 115; in the case where the offset is not abnormal, the step 114 is followed by the step 116. In the case where an abnormality has occurred in the offset voltage, the air-fuel ratio control cannot be performed through the air-fuel ratio signal Vaf; therefore, in the step 115, the air-fuel ratio control is prohibited, and then the routine is ended.

Figure 10:
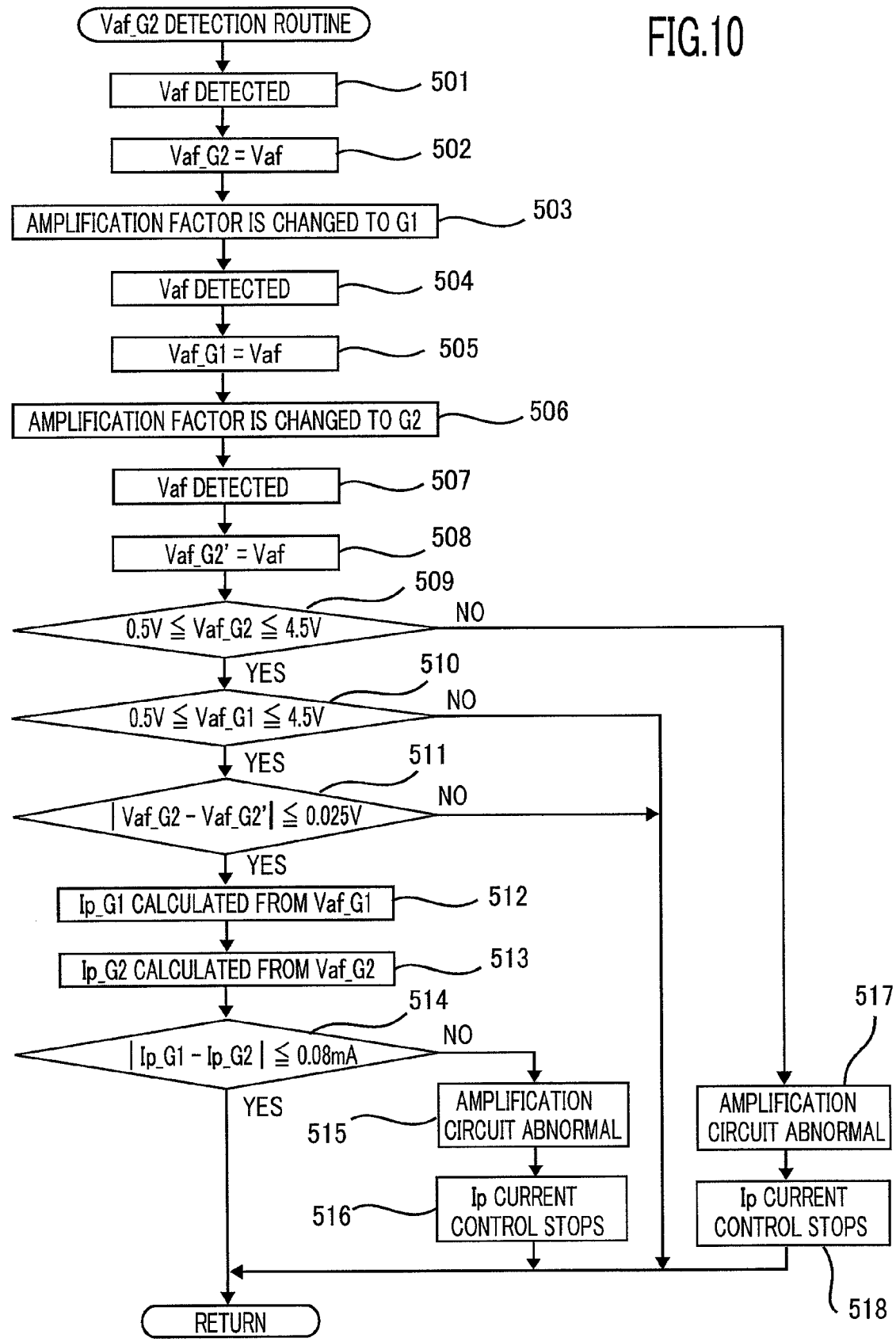
FIG. 10 is a flowchart representing the processing flow of a detection routine, for an air-fuel ratio signal at the amplification factor G2, according to Embodiment 1 of the present invention.

In the case where it is determined in the step 112 that the present timing is an offset voltage learning update timing, the step 114 is followed by the step 113 where an update routine, represented in FIG. 10, for the offset voltage Vofs_G2 at the amplification factor G2 is performed.

In FIG. 10, in the detection routine for the air-fuel ratio signal Vaf_G2, detection of the air-fuel ratio signal Vaf is performed in the step 501; the air-fuel ratio signal Vaf_G2 is updated with Vaf in the step 502.

In the step 503, the amplification factor of the amplification circuit 125 is changed to G1; in the step 504, the air-fuel ratio signal Vaf is detected; then, the air-fuel ratio signal Vaf_G1 is updated with Vaf in the step 505.

In the step 506, the amplification factor of the amplification circuit 125 is changed to G2; in the step 507, the air-fuel ratio signal Vaf is detected; then, the air-fuel ratio signal Vaf_G2' is updated with Vaf in the step 508.

In the step 509, it is determined whether or not the air-fuel ratio signal Vaf_G2 at the amplification factor G2 is within the normal range (0.5 V≦Vaf_G2≦4.5 V); in the case where the air-fuel ratio signal Vaf_G2 is within the normal range, the step 509 is followed by the step 510. In the case where the air-fuel ratio signals Vaf_G2 is not within the normal range, i.e., in the case where 0.5 V>Vaf_G2 or Vaf_G2>4.5 V, it is conceivable that an abnormality has occurred in the amplification circuit 125; therefore, in the step 517, it is determined that the amplification circuit is abnormal. In the step 518, the drive of the pump current control circuit 103 is stopped; the routine is ended; then, the step 518 is followed by the step 117 in FIG. 6.

In the step 510, it is determined whether or not the air-fuel ratio signal Vaf_G1 at the amplification factor G1 is within an estimated pump current calculable range (0.5 V≦Vaf_G1≦4.5 V); in the case where the air-fuel ratio signal Vaf_G1 is within the estimated pump current calculable range, the step 510 is followed by the step 511. In the case where the air-fuel ratio signals Vaf_G1 is not within the estimated pump current calculable range, i.e., in the case where 0.5 V>Vaf_G1 or Vaf_G1>4.5 V, the estimated pump current at the amplification factor G1 cannot be calculated because the pump current Ip is large; thus, the routine is ended; then, the step 510 is followed by the step 117 in FIG. 6.

In the step 511, it is determined, through the difference between the air-fuel ratio signals Vaf_G2 and the Vaf_G2', whether or not the variation of the pump current Ip during detection of the air-fuel ratio signal is within a predetermined range. In the case where the difference between the air-fuel ratio signals is within 0.025 V (the variation width of the pump current Ip is 0.06 mA at the amplification factor G1), it is determined that the air-fuel ratio has not varied, and the step 511 is followed by the step 512. In the case where the difference between the air-fuel ratio signals is the same as or larger than 0.025 V, the variation of the air-fuel ratio affects the estimated pump current; therefore, the routine is ended, and then the step 511 is followed by the step 117 in FIG. 6.

In the step 512, the estimated pump current Ip_G1 is calculated through the air-fuel ratio signal Vaf_G1; in the step 513, the estimated pump current Ip_G2 is calculated through the air-fuel ratio signal Vaf_G2.

In the step 514, it is determined whether or not the difference between the estimated pump currents Ip_G1 and Ip_G2 is within 0.08 mA; in the case where the difference between the estimated pump currents is within 0.08 mA, it is determined that the amplification circuit 125 is normal; the routine is ended; then, the step 514 is followed by the step 117 in FIG. 6. In contrast, in the case where the difference between the estimated pump currents Ip_G1 and Ip_G2 is larger than 0.08 mA, it is conceivable that an abnormality has occurred in the amplification circuit 125; therefore, in the step 515, it is determine whether or not the amplification circuit is abnormal. In the step 516, the drive of the pump current control circuit 103 is stopped; the routine is ended; then, the step 516 is followed by the step 117 in FIG. 6.

In FIG. 6 again, in the step 117, it is determine whether or not the amplification circuit is abnormal; in the case where the amplification circuit is abnormal, the step 117 is followed by the step 115; in the case where the amplification circuit is normal, the routine is ended.

In the step 115, in the case where the amplification circuit is abnormal, the air-fuel ratio control cannot be performed through the air-fuel ratio signal Vaf; therefore, the air-fuel ratio control is prohibited, and then the routine is ended.

Figure 11:
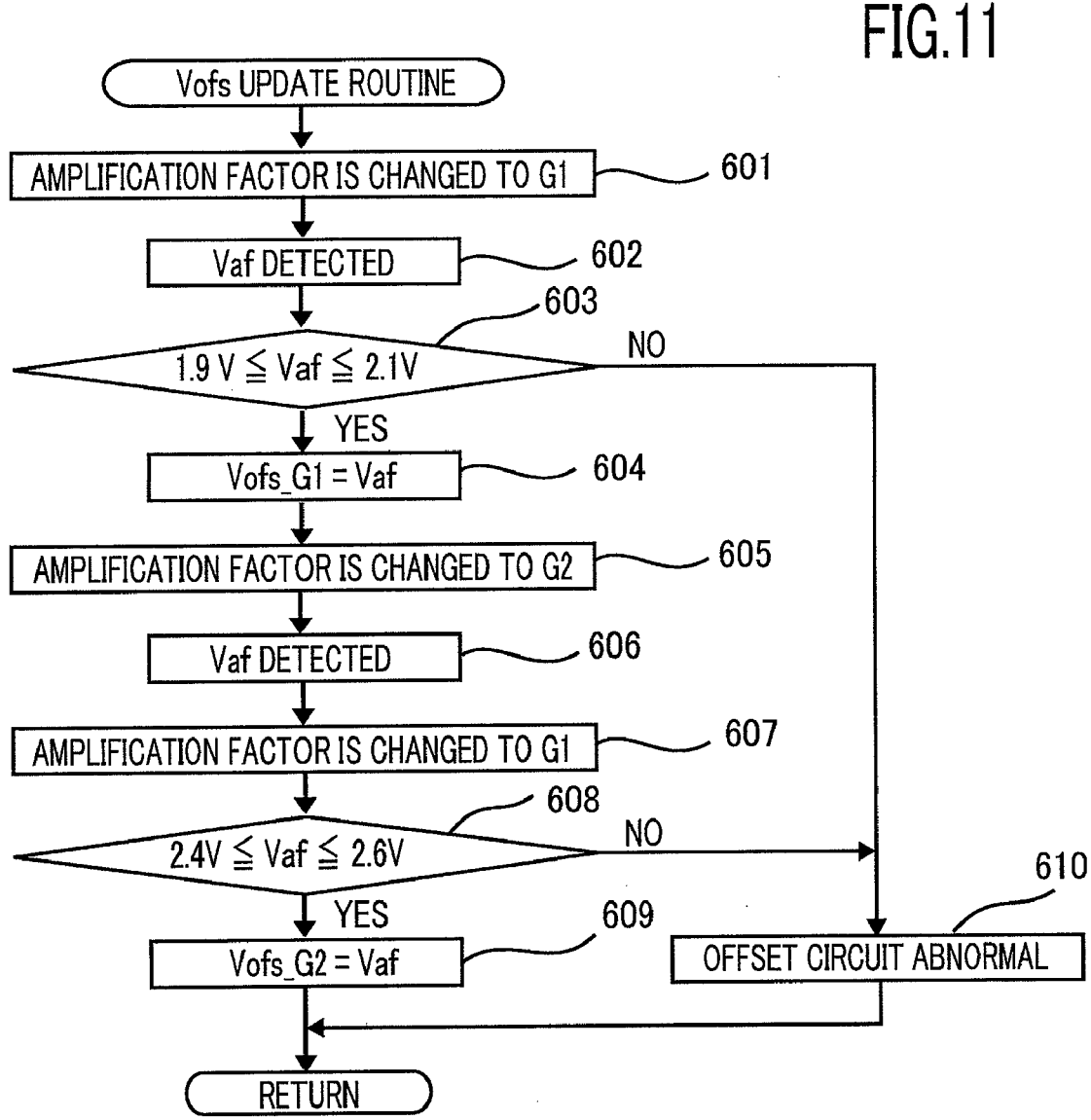
FIG. 11 is a flowchart representing the processing flow of an update routine, for an offset voltage, according to Embodiment 1 of the present invention.

In the case where, in the step 101, it is determined that the sensor is in a non-activation state, the step 101 is followed by the step 118 where the update routine for the offset voltage represented in FIG. 11 is performed.

In FIG. 11, in the update routine for the offset voltage, the amplification factor of the amplification circuit 124 is changed to G1 in the step 601; then, the air-fuel ratio signal Vaf is detected in the step 602.

In the step 603, it is determined whether or not the air-fuel ratio signal Vaf is within the normal range (1.9 V≦Vaf≦2.1 V) of the offset voltage at the amplification factor G1; in the case where the air-fuel ratio signal Vaf is within the normal range, the step 603 is followed by the step 604. In contrast, in the case where the air-fuel ratio signals Vaf is not within the normal range, i.e., in the case where 1.9 V>Vaf or Vaf>2.1 V, the step 603 is followed by the step 610 where it is determined whether or not the offset is abnormal; the routine is ended; then, the step 610 is followed by the step 119 in FIG. 6.

In the case where the offset voltage at the amplification factor G1 is normal, the offset voltage Vofs_G1 is updated with the air-fuel ratio signal Vaf in the step 604.

In the step 605, the amplification factor of the amplification circuit 125 is changed to G2; in the step 606, the air-fuel ratio signal Vaf is detected; then, in the step 607, the amplification factor of the amplification circuit 125 is changed back to G1.

In the step 608, it is determined whether or not the air-fuel ratio signal Vaf is within the normal range (2.4 V≦Vaf≦2.6 V) of the offset voltage at the amplification factor G2; in the case where the air-fuel ratio signal Vaf is within the normal range, the step 608 is followed by the step 609. In contrast, in the case where the air-fuel ratio signals Vaf is not within the normal range, i.e., in the case where 2.4 V>Vaf or Vaf>2.6 V, the step 608 is followed by the step 610 where it is determined whether or not the offset is abnormal; the routine is ended; then, the step 610 is followed by the step 119 in FIG. 6.

In FIG. 6 again, in the step 119, it is determine whether or not the offset is abnormal; in the case where the offset is abnormal, the step 119 is followed by the step 120; in the case where the offset is not abnormal, the routine is ended. In the case where an abnormality has occurred in the offset voltage, the air-fuel ratio control cannot be performed through the air-fuel ratio signal Vaf; therefore, in the step 120, the air-fuel ratio control is prohibited, and then the routine is ended.

As described in detail heretofore, in the internal-combustion-engine control apparatus according to Embodiment 1, in the case where an abnormality occurs in the amplification circuit 125 or the offset circuit 126 of the exhaust gas sensor control device 111, the abnormality can rapidly be detected, whereby deterioration in an exhaust gas can be prevented.

Industrial Applicability

An internal-combustion-engine control apparatus according to the present invention can be applied to the internal-combustion engine of a vehicle that deals with tightening of exhaust gas restrictions and further improvement of gasoline mileage.

Various modifications and alterations of this invention will be apparent to those skilled in the art without departing from the scope and spirit of this invention, and it should be understood that this is not limited to the illustrative embodiments set forth herein.

What is claimed is:

1. An internal-combustion-engine control apparatus comprising:
an exhaust-gas sensor that outputs as a detection signal an electric current that varies in accordance with an air-fuel ratio of an exhaust gas of an internal combustion engine;
a current detection resistor that detects the electric current;
an amplification circuit that amplifies, while switching amplification factors thereof, the detection signal detected by the current detection resistor, in a plurality of detection ranges for an air-fuel ratio that can be detected by the exhaust-gas sensor;
an offset circuit that adds an offset voltage to the detection signal amplified by the amplification circuit so that said detection signal becomes an air-fuel ratio signal that can be detected by an A/D converter; and
an air-fuel ratio detection means that makes an electric current flow, in accordance with the air-fuel ratio signal, into the exhaust-gas sensor and corrects an air-fuel ratio of the internal combustion engine in such a way that said air-fuel ratio becomes a target air-fuel ratio,
wherein the air-fuel ratio detection means determines whether the exhaust-gas sensor is in an activation state or in a non-activation state, and stops an electric current flowing into the exhaust-gas sensor, in the case where it is determined that the exhaust-gas sensor is in a non-activation state; and
wherein the air-fuel ratio detection means switches the amplification factors of the amplification circuit so as to detect the air-fuel ratio signal at the time when an electric current flowing into the exhaust-gas sensor is stopped, and determines whether or not the offset circuit is abnormal, based on whether or not the respective air-fuel ratio signals at the amplification factors are within a predetermined range.

2. The internal-combustion-engine control apparatus according to claim 1, wherein, in the case where it is determined that the exhaust-gas sensor is in an activation state, an electric current flowing into the exhaust-gas sensor is stopped; the air-fuel ratio signal at the time when the electric current flowing into the exhaust-gas sensor is stopped is detected; then, it is determined whether or not the offset circuit is abnormal, based on whether or not the detected air-fuel ratio signal is within a predetermined range.

3. The internal-combustion-engine control apparatus according to claim 1, wherein there is set at least one combination, of the offset voltage and the amplification factor, in which the whole range of the detection signal can be detected by the A/D converter.

4. The internal-combustion-engine control apparatus according to claim 1, further including a heating means that heats the exhaust-gas sensor.

5. An internal-combustion-engine control apparatus comprising:
an exhaust-gas sensor that outputs as a detection signal an electric current that varies in accordance with an air-fuel ratio of an exhaust gas of an internal combustion engine;
a current detection resistor that detects the electric current;
an amplification circuit that amplifies, while switching amplification factors thereof, the detection signal detected by the current detection resistor, in a plurality of detection ranges for an air-fuel ratio that can be detected by the exhaust-gas sensor;
an offset circuit that adds an offset voltage to the detection signal amplified by the amplification circuit so that said detection signal becomes an air-fuel ratio signal that can be detected by an A/D converter; and
an air-fuel ratio detection means that makes an electric current flow, in accordance with the air-fuel ratio signal, into the exhaust-gas sensor and corrects an air-fuel ratio of the internal combustion engine in such a way that said air-fuel ratio becomes a target air-fuel ratio,
wherein the air-fuel ratio detection means determines whether the exhaust-gas sensor is in an activation state or in a non-activation state, and switches the amplification factors of the amplification circuit so as to detect the air-fuel ratio signal, in the case where it is determined that the exhaust-gas sensor is in a non-activation state; and wherein the air-fuel ratio detection means calculates a signal corresponding to an electric current that flows into the exhaust-gas sensor, based on the detected air-fuel ratio signal, and determines whether or not the amplification circuit is abnormal, based on whether or not the deviation of the detected signal is within a predetermined range.

6. The internal-combustion-engine control apparatus according to claim 5, wherein, in the case where a signal corresponding to an electric current that flows into the exhaust-gas sensor cannot be calculated based on the air-fuel ratio signal, it is determined whether or not the amplification circuit is abnormal, based on whether or not the air-fuel ratio signal is within a predetermined range.

* * * * *